United States Patent [19]

Richards

[11] Patent Number: 4,802,785

[45] Date of Patent: Feb. 7, 1989

[54] JOINT CONSTRUCTION AND OVERHEAD HANGER

[76] Inventor: Peter S. Richards, 100 Mt. Si Pl. NW., Issaquah, Wash. 98027

[21] Appl. No.: 47,439

[22] Filed: May 6, 1987

Related U.S. Application Data

[63] Continuation-in-part of Ser. No. 811,939, Dec. 20, 1985, Pat. No. 4,667,916.

[51] Int. Cl.⁴ .................................................. B25G 3/00
[52] U.S. Cl. ..................................... 403/27; 403/260; 248/343
[58] Field of Search .................. 248/317, 74.1, 59, 70, 248/342–344; 16/39; 403/372, 260, 370, 245, 27; 411/103, 111, 112

[56] References Cited

U.S. PATENT DOCUMENTS

| | | | |
|---|---|---|---|
| 1,031,462 | 7/1912 | Paine | 16/39 |
| 1,736,722 | 11/1929 | Newman | 411/112 |
| 1,753,183 | 4/1930 | Johnson | 16/39 |
| 1,768,505 | 6/1930 | Carr | 16/39 |
| 2,190,555 | 2/1940 | Toce et al. | 287/20 |
| 2,281,279 | 4/1942 | Fox | 67/23 |
| 2,730,419 | 1/1956 | Watrous et al. | 248/188 |
| 2,798,748 | 7/1957 | Maurer | 287/52 |
| 2,922,455 | 1/1960 | Braendel | 151/41.7 |
| 2,950,937 | 8/1960 | Bedford, Jr. | 287/126 |
| 2,972,495 | 2/1961 | Yalen | 287/54 |
| 3,009,747 | 11/1961 | Pitzer | 308/71 |
| 3,135,033 | 6/1964 | Jackson | 24/122.3 |
| 3,271,056 | 9/1966 | Frisbey, Jr. | 287/20.92 |
| 3,355,201 | 11/1967 | Barwick | 287/119 |
| 3,506,227 | 4/1970 | Jenkins | 248/59 |
| 3,633,862 | 1/1972 | Breen | 248/251 |
| 3,779,659 | 12/1973 | Habert | 403/372 |
| 4,033,222 | 7/1977 | Wilson | 411/33 |
| 4,134,703 | 1/1979 | Hinners | 403/104 |
| 4,147,458 | 4/1979 | Elders | 411/33 |
| 4,573,652 | 3/1986 | Richards | 248/74.1 |

FOREIGN PATENT DOCUMENTS

| | | | |
|---|---|---|---|
| 483979 | 6/1952 | Canada | 411/33 |
| 668912 | 4/1950 | United Kingdom . | |
| 2061365 | 4/1950 | United Kingdom | 411/33 |

Primary Examiner—Andrew V. Kundrat
Attorney, Agent, or Firm—Delbert J. Barnard

[57] ABSTRACT

A support leg (14) is attached to a ceiling structure (10) by means of a threaded stud (12) which mates with a threaded opening (18) in an insert (16) which is swage connected to the upper end of the support leg (14). A flat bar (22) is attached to the lower end of the support leg (14) so that it extends horizontally and makes a "T" with the support leg (14). An expansion clamp assembly (28, 36, 40, 44, 46, 50, 74) is carried by the bar (22). This assembly is plugged into the tubular lower end portion (26) of the support leg (14). Wing portions (58) of a nut wing washer (50) are deflected by the insertion of the assembly into the tubular portion (26), and edges (62) of the wings (58) are biased into a tight gripping contact with the inner tubular portion (26). This secures the nut wing washer (50) and a nut (46) against rotation. Then, the member (22) is rotated, relative to the support leg (14), causing a relative endwise movement of a stud (28) carried by the member (22) into the nut (46). This movement causes a cam surface (40) on a cam ring (36) to be moved against wings (66) on one or more main locking washers (44), in a direction deflecting the wings outwardly, and moving the edges (70) on the wings (66) into a tight metal displacing engagement with the inner wall of the socket (26). Rotation of the member (22) is continued until the member (22) is securely fastened to the support leg (14). A conical brace member (80) is provided at the upper end of the support leg (14) which is preloaded in compression.

30 Claims, 4 Drawing Sheets

Fig.15

JOINT CONSTRUCTION AND OVERHEAD HANGER

RELATED APPLICATION

This is a continuation-in-part of my copending applicaton Ser. No. 811,939, filed Dec. 20, 1985, and entitled "Overhead Hanger and Joint Construction," and now U.S. Pat. No. 4,667,916.

TECHNICAL FIELD

This invention relates to a joint construction between two members, a first of which includes a socket, and in particular to a joint construction including an expansion connector assembly carried by the second member that is merely plugged into the socket and then rotated, to provide a strong and firm connection between the two members.

BACKGROUND ART

The general concept of an expansion connector is old. This type of connector comprises a first part which is in the nature of an insert and a second part which includes a socket for the insert. The insert is inserted into the socket and expanded to exert a clamping or holding force on the wall of the socket.

Examples of expansion connectors which can be found in the patent literature are shown by the following U.S. Pat. No. 2,190,555, granted Feb. 13, 1940, to Charles A. Toce, Robert F. Broussard and William N. Woodruff; U.S. Pat. No. 2,281,279, granted Apr. 28, 1942, to David A. Fox; U.S. Pat. No. 2,798,748, granted July 9, 1957, to Albrecht Maurer; U.S. Pat. No. 3,009,747, granted Nov. 21, 1961, to Kenneth H. Pitzer; U.S. Pat. No. 3,135,033, granted June 2, 1964, to Samuel H. Jackson; U.S. Pat. No. 3,355,201, granted Nov. 28, 1967 to Leroy E. Barwick; U.S. Pat. No. 3,779,659, granted Dec. 18, 1973 to Roger Habert; and U.S. Pat. No. 4,134,703, granted Jan. 16, 1979, to Earl S. Hinners.

The mechanisms disclosed by these patents should be carefully considered for the purpose of putting the present invention into proper perspective relative to the prior art.

The present invention relates to the provision of a new and unique joint construction comprising a first member which includes an expansion insert. The insert is merely slipped endwise into a socket carried by the second member, and then one of the members is simply rotated relative to the other, and the insert functions to dig into the wall of the socket and in that manner securely connect the two members together.

Another object of the invention is to provide an improved mounting structure for a suspended object (e.g. a lighting fixture) which utilizes the joint costruction, and which makes it possible for the user to disassemble and then later reassemble the mounting structure, without the use of destructive methods (e.g. removing parts by use of metal cutting equipment).

Ship construction is done in stages. Quite often, a component is installed and then it is discovered that the component must be removed in order to either install another component, or perform some other stage of the construction of the ship. Light fixtures must be securely affixed to the ceiling structure and this has in the past been done by welding the upper ends of support leg members to the ceiling and welding cross members to the lower ends of the support leg members, and then bolting the light fixtures to the cross members. When a mounting structure was installed in this way it became necessary to remove it in a destructive manner, such as by use of a cutting torch. The mounting structure of the present invention provides a way of easily connecting and disconnecting the parts of the mounting structure to each other and to the ceiling structure, so that if it becomes necessary to remove the mounting structure, it can be done without destructive affects to this component, so that such component can be reused. The mounting structure of the present invention makes it easy to raise or lower a lighting fixture or similar object. The mounting structure need only be disassembled and then reassembled with a longer or shorter support leg.

DISCLOSURE OF THE INVENTION

In basic form the joint construction of the present invention comprises a first member which includes a cylindrical sidewall defining a socket having an inner surface, and a second member which includes a connector assembly that plugs into the socket. The connector assembly comprises a fixed in position stud having a base, a free end and a threaded portion adjacent the free end. A cam ring is provided at the base of the stud. The cam ring has a base end and an opposite end. The cam ring is smaller in diameter than the inside diameter of the socket. The cam ring includes an edge at its opposite end that is spaced radially outwardly from said stud. At least one main locking disk is located on the stud. Each main locking disk includes a central opening through which the stud extends, and a plurality of wings spaced around the disk and formed towards the beveled edge of the cam ring. The wings have outer grip edges. Each main locking disk is sized to slip fit into the socket. A nut is threaded onto the threaded portion of the stud, outwardly of the main locking disk(s). The nut includes a flange at its end nearest the cam ring and a wrench portion extending from said flange in a direction opposite the cam ring. A nut wing washer is secured to the nut. The nut wing washer has a central opening corresponding in shape to the wrench portion on the nut in which the wrench portion of the nut is received. Means are provided for holding the nut wing washer against axial movement off from the nut in the direction opposite the lip. The nut wing washer has a plurality of wings which are bent to extend toward the cam ring. The wings have grip edges at their outer ends. It also has a plan form that is larger than the inside diameter of said socket.

The two members are easily and quickly connected together by a slip-in movement of the connector assembly on the second member into the tubular socket of the first member. This slip-in movement causes a bending of the wings of the nut wing washer, attended by the edges of such wings gripping the inner surface of the socket. Next, one of the members is rotated relative to the other. The grip of the edges of the wings of the nut wing washer holds the nut wing washer against rotation relative to the socket. The nut wing washer is secured against rotation to the nut, and so the nut also is held in position relative to the first member during the rotation. As a result, there is an axial travel of the nut on the stud toward the cam ring. Such axial travel causes the beveled edge of the cam ring to push the wings of the main lock disk(s) outwardly, so as to press their edges into tight galling engagement with the inner surface of the socket.

In accordance with another aspect of the invention, a joint construction of the type described above is provided at the lower end of a support leg. The connector assembly is a part of a frame member which is connected to the lower end of the support leg. The upper end of the support leg is connected to an overhead structure, such as a ceiling, or the like. In preferred form, this mounting structure is used for suspending an object from the overhead of the ship. The upper end of the support leg is secured to a portion of the ceiling and the frame member is attached to the lower end of the support leg, in the manner described above.

Also in preferred form, the upper end of the support leg is provided with a screw connection between it and a base member that is connected to the ceiling. This construction allows the mounting structure to be easily and quickly removed without injury to the components of the mounting structure.

Other more detailed features of the invention are described below in connection with the description of the illustrated embodiments.

BRIEF DESCRIPTION OF THE DRAWINGS

Like reference numerals are used to designate like parts throughout the several views of the drawings, and.

BEST MODE FOR CARRYING OUT THE INVENTION

FIGS. 1–9 illustrate a preferred form of overhead support member and a preferred form of joint construction.

Figures 1, 2, 3:
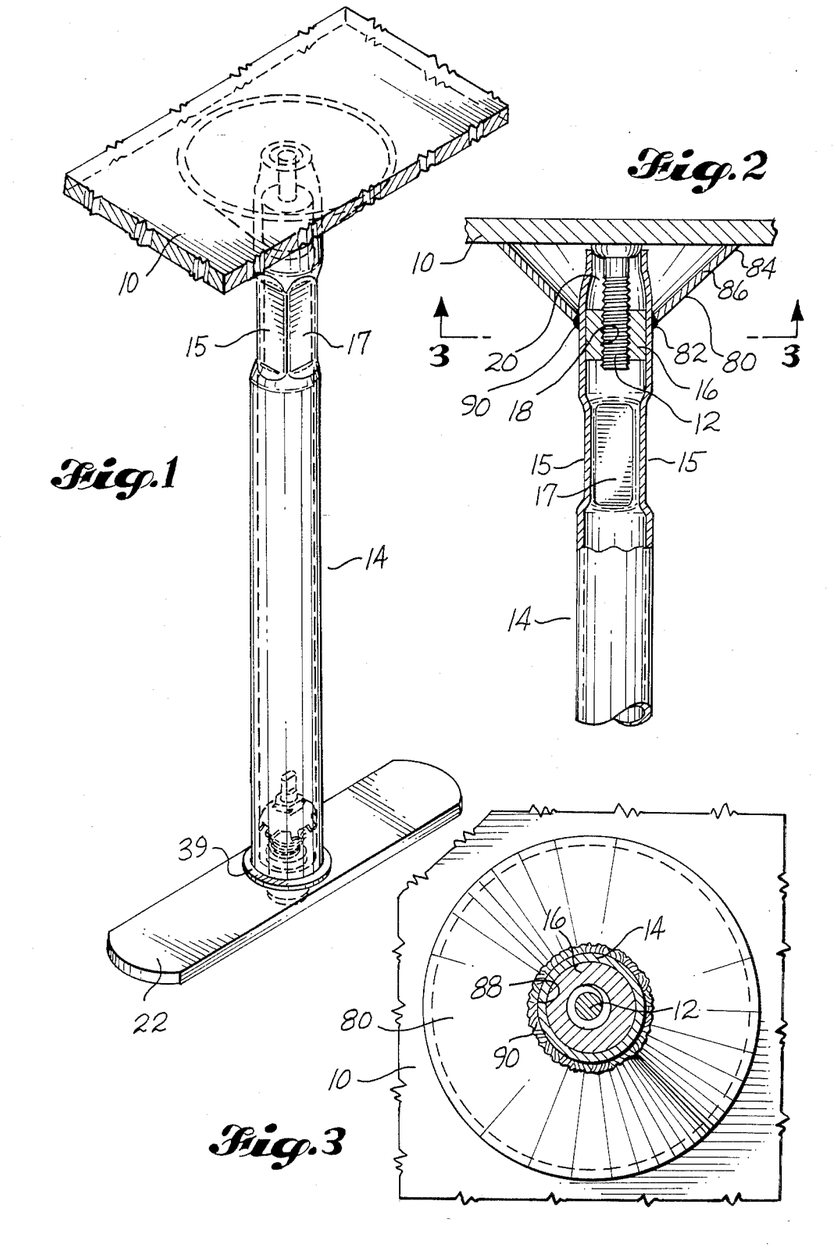
FIG. 1 is an isometric view of a mounting structure constituting a preferred embodiment of the invention.
FIG. 2 is a fragmentary view of a detachable threaded connection at the upper end of a support leg and a plate which is welded or otherwise secured to a ceiling structure or the like, or is the ceiling.
FIG. 3 is a sectional view taken substantially along line 3—3 of FIG. 2.

Referring to FIG. 1, member 10 is an overhead structure.

Member 10 includes a downwardly extending threaded stud 12 (FIG. 2).

In preferred form, a mounting leg 14 includes an insert member 16 at its upper end. Member 16 includes a threaded axial opening 18. The upper end portion of support leg 14 may be swaged about the insert 16, for firmly gripping the insert 16 in this manner. The swaging produces a reduced diameter interior opening 20 through which the insert 16 cannot pass in the upward direction. The portion of support leg 14 below insert 16 is preferably swagged to provide a cross section which includes at least one pair of opposed wrench flats 15. The illustrated example includes a second pair of wrench flats 17. A reduced diameter section below the insert 16 prevents downward movement of insert 16.

In preferred form, a flat rectangular bar 22 is provided at the lower end of support leg 14. Bar 22 carries a connector assembly 24 which can be easily moved endwise into the tubular lower end portion 26 of the support leg 14.

The connector assembly 24 comprises a stud 28 having a base end 30 which in FIG. 3 is shown connected to the member 22. Specifically, the stud 28 is in the form of a bolt having a head 32 at its lower end. The square shank base of the bolt 28' extends through a square opening 34 formed in member 22.

A cam ring 36 is provided at the base end of stud 28. The cam ring 36 includes a base end 38 which contacts a washer 39 which in turn contacts the upper surface of member 22. At its opposite end the cam ring 36 includes an edge 40 spaced radially outwardly from the stud 28. Edge may be beveled, as illustrated. This edge 40 constitutes a cam surface, the function of which will hereinafter be described. Stud 28 extends upwardly through a central opening 42 in the cam ring 36.

Figures 4, 5, 6, 7:
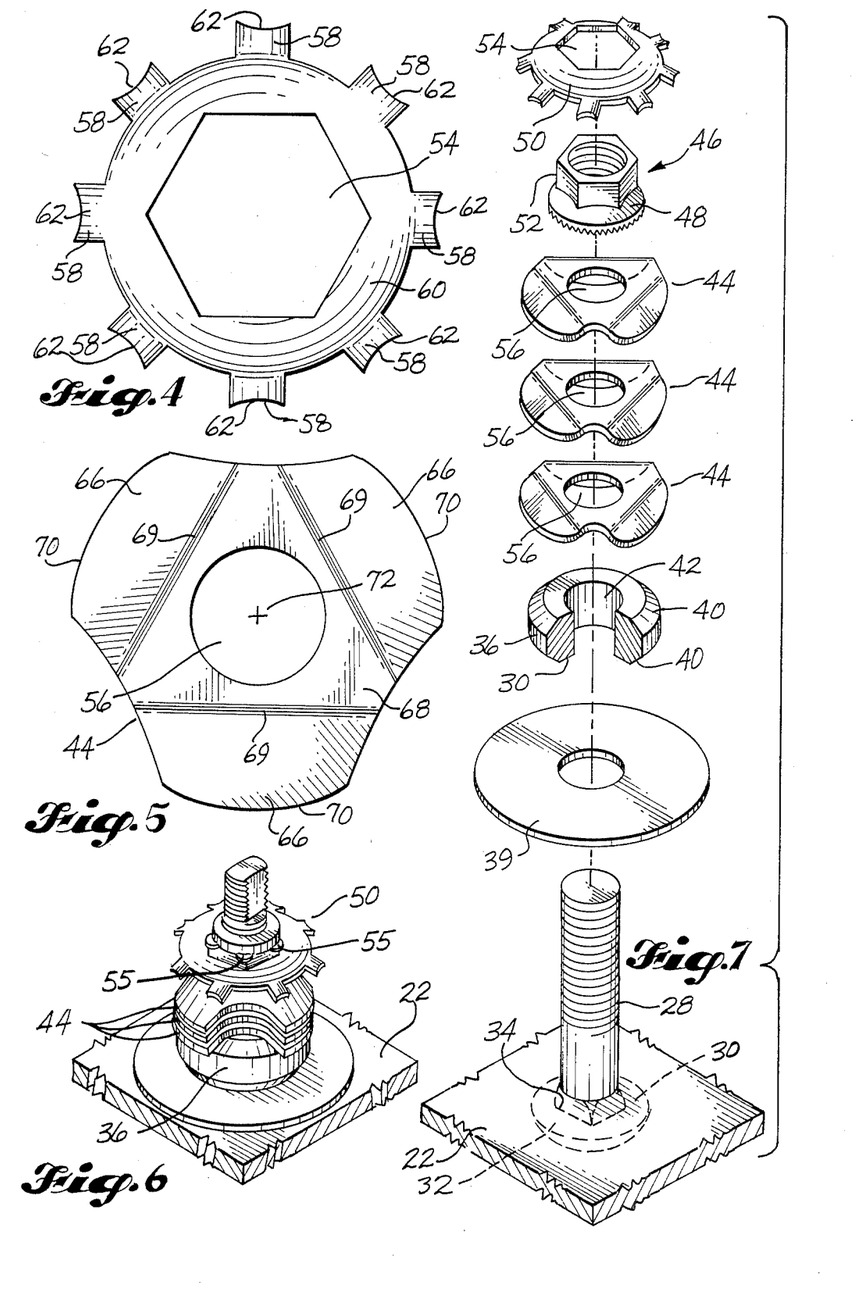
FIG. 4 is a top plan view of a nut wing washer forming a part of the connector assembly.
FIG. 5 is a top plan view of a main locking disk.
FIG. 6 is an isometric view of the connector assembly in an assembled condition.
FIG. 7 is an exploded isometric view of the connector assembly.

In accordance with the invention, one or more main locking disks 44 are stacked on the stud 28, 28'. Three such main locking discs 44 are shown in FIGS. 6≠9. A nut 46 is provided above the main locking disk(s) 44. Nut 46 includes a flange 48 at its lower end, down onto which the central portion of a nut wing washer 50 sits. The illustrated nut 46 has a wrench flat portion 52 of conventional hexagonal form. The nut wing washer 50 includes a central opening 54 which is sized to snugly receive the hexagonal wrench flat portion 42. When the nut wing washer 50 is installed, there is an engagement between the wrench flats on portion 52 on nut 46 and the edge surfaces of the opening 54 which prevents the nut wing washer 50 from rotating relative to the nut 46. As earlier stated, the nut wing washer 50 sits down on the flange 48 and such flange 48 prevents it from moving axially in the downward direction. In preferred form, upper corner portions of the nut 46 are deformed to form projections 55 which serve to prevent the nut wing washer 50 from moving off the nut in the direction away from flange 48.

The main lock disks 44 have circular openings 56 at their centers through which the threaded shank portion 56 of the stud 28 extends.

The nut wing washer 50 and the main locking disks 44 have winged portions which are bent down at an angle to a flat central portion. FIG. 4 is a plan view of the nut wing washer 50. By way of example, it is shown to include eight wings 58 projecting downwardly and outwardly from a conical central portion 60. The hexagonal opening 54 is formed in the central portion 60.

The outer edges 62 of the wings 58 may be cut to each comprise a point on each side and a concave region between the points, as illustrated. In any event, the edges 62 lie on a circle which is generated from the center 64 of opening 54. This circle is slightly larger in diameter than the inside diameter of the tubular end portion 26 of member 14.

The nut wing washer 50 may be constructed from a thinner material than the main locking disks 44, for reasons to be hereinafter explained.

As shown by FIG. 5, each main locking disk 44 includes three wings 66 equally spaced about the locking disk 44. Each wing 66 forms a dihedral with a flat central portion 68. Fold lines 69 give the central portion 68 a generally triangular shape. The outer edges 70 of the wings 44 may be plain or serrated. The plain form is illustrated.

As shown by FIG. 5, the edges 70 lie on circles having their center at the center 72 of circle 56. The circle on which the edges 70 lie is either substantially equal to or slightly less in diameter to the inside diameter to the tubular end portion 26 of member 14, so that the main lock discs will not interfere with easy insertion of the connector assembly into the socket 26. Easy insertion is the key factor.

The connector assembly is assembled as follows. The stud 28 is connected to the member 22, such as by making stud 28 in the form of a bolt. The washer 39 and the cam ring member 36 are then installed onto the stud 28. Next the main locking disk(s) 44 is placed onto the stud 28 with their wings 44 extending downwardly toward the edge or cam surface 40. Next, the nut 46 (with nut wing washer attached) is installed and is screwed down until it contacts the main locking disc 44 (or the top main locking disk 44 in a stack).

Figure 8:
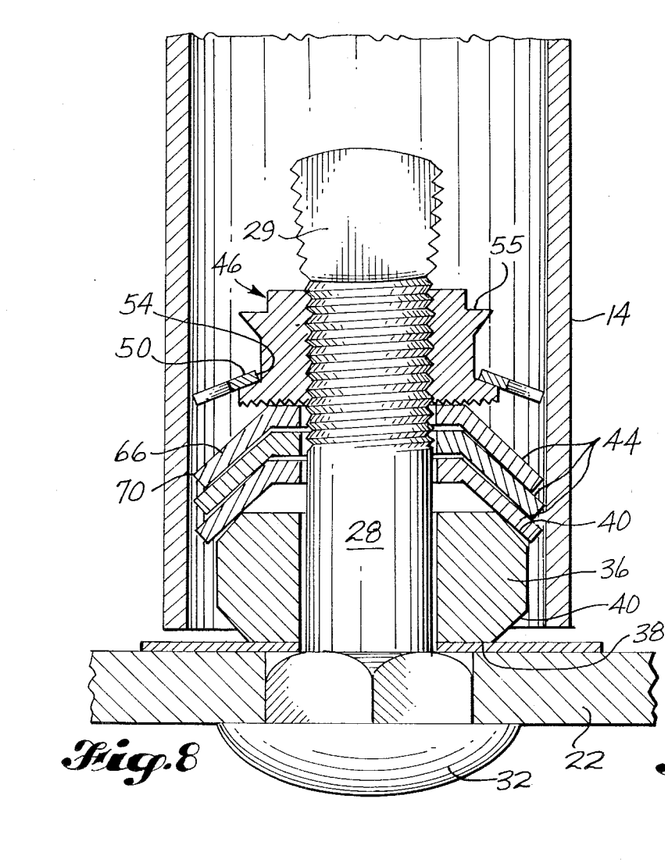
FIG. 8 is a fragmentary sectional view at the lower end of the support leg, showing the lower member in the process of being moved upwardly into the support leg member.
Figure 9:
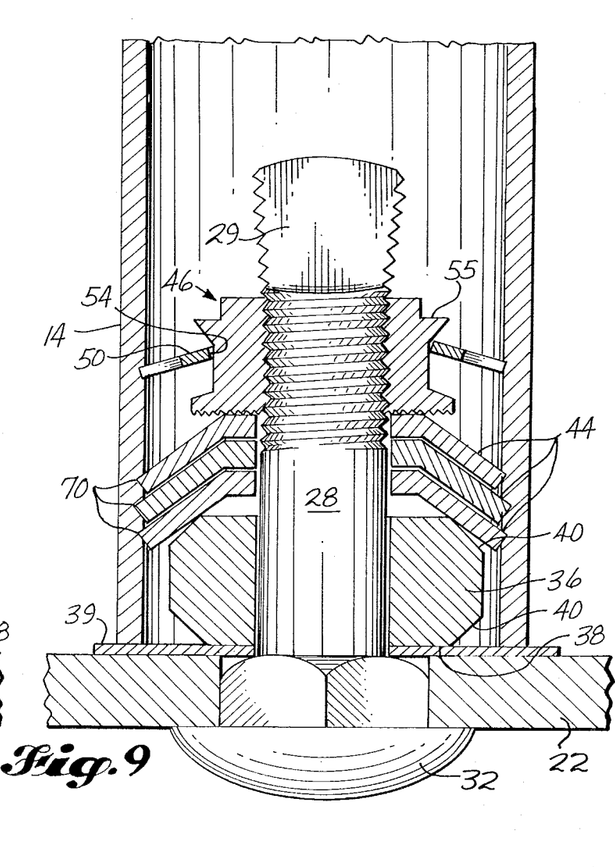
FIG. 9 is a view like FIG. 9, but of a final assembled condition.
Figure 10:
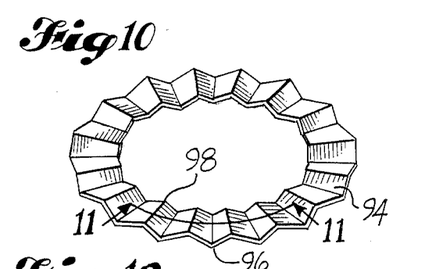
FIG. 10 is an isometric view of a first form of load indicating washer.
Figure 11:
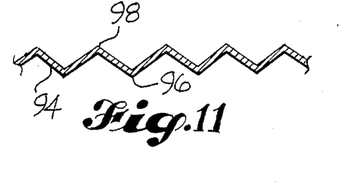
FIG. 11 is an elevational view of the load indicating washer shown by FIG. 10.

After the elements 36, 44, 46, 50 are installed onto the stud 28 the upper or free end of the stud 28 may be spread, as shown by FIGS. 6, 8 and 9, for the purpose of preventing removal of the nut 46 from the stud 28. This particular technique is per se old.

When the parts are assembled, the lowermost main locking disk 44 is in contact with the upper beveled surface 40 of cam member 36. The second main locking washer 44 is down in contact with the first main locking washer 44 and the third main locking disk 44 is down in contact with the second main locking disk 44. The nut 46 is down against the upper main locking disk 44. The nut wing washer 50 is down on the lower flange portion 48 of the nut 46. The flattened or spread portion 29 of stud 28 extends down to the top of nut 46, so that there is no possibility of nut 46 becoming loose. The contact between the elements is important so that any rotation of member 22 relative to member 14 will act to create a straightening force on the wings of the main lock disks 44.

After the connector assembly 24 is on the stud 28, such assembly 24 is aligned with the open end of tubular portion 26 of support leg member 14, and then member 22 is moved upwardly, to force the connector assembly 24 into the interior of end portion 26. This procedure is illustrated in FIG. 8.

As stated above, the nut wing washer 50 is constructed to have the edges 62 of its wings 58 lie on a circle that is larger in diameter than the inner diameter of tubular portion 26. Accordingly, in order for the nut wing washer 50 to enter into the interior of tubular portion 26, the wings 58 must bend downwardly some from their original position. The nut wing washer 50 is constructed from a sheet metal of suitable thickness to allow this bending to easily occur, but at the same time have enough stiffness in the wings 58 that once the nut wing washer 50 is inside of tubular portion 26, the wings 58 will grip the cylindrical wall of portion 26 a sufficient amount to hold the nut 46 against rotation during rotation of member 22.

As previously described, the edges 70 of the main locking disks 44 lie on a circle that is of such a dimension that the locking disks can be easily moved endwise into the tubular portion 26. However, at the same time, the edges 70 are either already in contact with the inner surface of tubular member 26, or are at least closely adjacent to the inner surface of tubular portion 26.

Washer 39 performs two functions. It is preferably constructed from stainless steel so that it will be an electrolytic barrier between member 14 and member 22. This would allow construction of member 14 from one metal (e.g. aluminum) and member 22 from a second metal (e.g. soft steel). Washer 39 also functions as a bearing. The cam member 36 is shown to include a bevel 40 at each of its ends. Preferably, the beveled surfaces 40 are of the same size so that it makes no difference in which direction the cam member 36 is installed onto the stud 28.

As already described, the upwardly directed cam surface 40 makes contact with the lowermost main locking disk 44, and during relative rotation of member 22 and stud 28 relative to tube 14 and nut 46, it exerts a straightening force on the wing portions 66 of the main locking disk 44. The lower bevel 40 also has a function. Its presence decreases the area at the lower end of the cam member 36 which is in contact with the washer 39. The area of such end surface is smaller than the area of the upper cam surface 40. Friction between cam surface 40 and the locking disk 44 is greater than the friction between the lower end surface of cam member 36 and washer 39. As a result, during rotation of member 22 and bolt 28 relative to member 14 and nut 46 there will be relative rotation of the cam member 36 on the washer 39.

The washer 39 may be provided with a suitable coating which is corrosion resistant and preferably also reduces friction.

After the connector assembly is within the tubular portion 26 the member 22 is rotated. The nut wing washer 50 holds nut 46 against rotation and so there is an axial movement of the nut 46 along the stud 28. When the member 22 is rotated in the clockwise direction the nut 46 travels relatively along the stud 28 toward the member 22. This causes a squeezing of the main lock disk(s) 44 between the nut 44 and the cam ring 36. The edge 40 of cam ring 36 imposes an axial force on the wings 66, causing them to swing upwardly. As bending of the wings 66 occurs, the edge diameter of disk(s) 44 increases and the edges 70 are moved into a "biting" displacement with the inner wall of tubular portion 26. The member 22 is rotated until further rotation is very difficult and the member 22 is properly oriented relative to the desired position of the member that is going to be attached to it. At this time the edges 62 of washer 50 and the edges 70 of locking disk(s) 44 have been moved into the wall material of tubular portion 26 an amount sufficient that the member 22 is securely connected to support leg 14 and will remain connected when subjected to forces which exceed the forces that the members 14, 22 are designed to encounter.

A comparison of FIGS. 8 and 9 shows that during tightening of the screw joint between bolt 28 and nut 46 the nut 46 moves in position axially downwardly away from flange 48 on nut 46 towards the stop elements 55. The parts are dimensioned such that the main lock disks 44 are in a tight gripping contact with the sidewall of member 14 before the stop elements 58 would tend to exert any substantial position altering force on the nut wing washer 50. FIG. 9 shows the preferred position of the nut 46 to the nut wing washer 50 when the joint has been sufficiently tightened.

The hanger assembly shown by FIG. 1 is especially adapted for use in connecting lighting fixtures to ceilings in naval ships. At the present time, there are hanger structures in existence which include a vertical support leg that is welded at its upper end to a ceiling structure, and is welded at its lower end to a support bar. If it ever becomes necessary to remove the structure, it becomes necessary to cut the welds or the members.

The support structure shown by FIG. 1 can be usually secured to and removed from a ceiling structure. If after the assembly has been installed, in the manner described above, it becomes necessary to remove the hanger structure for some reason, this can be easily done without damage. The light fixture or whatever other structure is secured to the member 22 is first removed. Then, the support leg 14 is rotated in the screw loosening direction, for unscrewing the threaded joint at the upper end of member 14. The hanger 14, 22 can be easily reattached by again screwing the leg member 14 to the ceiling stud 12. When the joint is tightened, the member 22 will be substantially back to its proper position. A wrench can be applied to the flats 15, 17 and used for turning the leg 14 relative to the stud 12.

The expansion mechanism of this invention does not involve a mere "friction" fit. The edges of the wings actually penetrate into the socket wall material. There is a galling action. The wings deform and displace the wall material and dig progressively further into the socket wall as the withdraw force is increased. Under actual test, there was zero creep at 10,000 lbs. of load acting to withdraw the insert from the socket. A friction type expansion anchor would experience creep at a load of about 400 lbs. or less.

The joint construction formed between member 22 and the lower end of support leg 14 has utility in other installations in addition to the installation illustrated by FIG. 1. Member 22 can be any member, and can itself be a tubular member. The tubular portion 26 may be an end piece, or a socket portion of a nontubular member.

In preferred form, the upper end of support leg 14 is provided with a bracing preload member 80, shown to be conical in form. Member 80 includes a small end 82, a large end 84 and a sidewall 86 disposed between the ends 82, 84. The small end defines a central opening 88 in which the leg 14 is received. Member 80 may be connected to leg 14 by a weld bead 90. Preferably, the weld line 90 is located radially outwardly of the insert 16. The upper end 84 of member 80 defines a circular edge that makes contact with member 10. Edge or end 84 projects axially upwardly beyond the upper end of member 14 so that when contact is first made between edge 84 and member 10 there is clearance or a gap between the upper end of leg 14 and member 10. The upper end of stud 12 is welded to member 10 and a fillet 92 surrounds the base of stud 12. The upper end of leg 14 makes contact with this fillet 92 during tightening rotation of the leg 14. Gauling occurs so that a tight contact is made where the leg metal contacts the weld metal. A tight fit is created which resists sideways movement of the upper end of leg 14 about the connection 90 in response to a sideways load on a lower portion of the leg 14 The cone 80 is put into compression and this preloads the joint. In use, the preload absorbs vibration forces imposed on the joint. This joint construction is the subject matter of my application Ser. No. 07/047,051, filed May 6, 1987, now U.S. Pat. No. 4,735,390, issued Apr. 5, 1988, and entitled Support Leg Joint Construction with Bracing.

Figure 12:
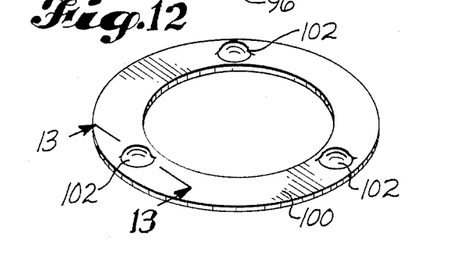
FIG. 12 is an isometric view of a second form of load indicating washer.
Figure 13:
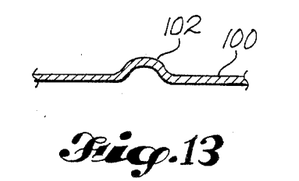
FIG. 13 is an elevational view of the load indicating washer shown by FIG. 12.

FIGS. 10–13 show two forms of load indicating washers which may be used with the joint. Washer 94 is constructed to include a plurality of radial serrations extending substantially all the way around the load indicating washer 94. This construction provides peaks 96 on one side and peaks 98 on the other side of the washer 94. FIGS. 12 and 13 show a load indicating washer 100 which is flat except for the provision of a plurality of dimples or blisters 102. As best shown by FIG. 13, each blister 102 projects upwardly above the general plane of the washer 100.

Figure 14:
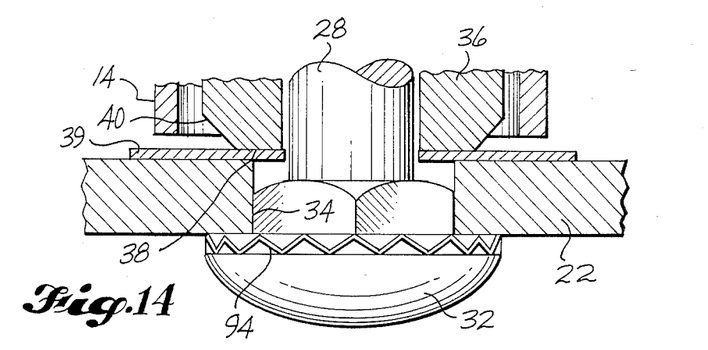
FIG. 14 is a view like FIG. 9, but showing the use of a load indicating washer.
Figure 15:
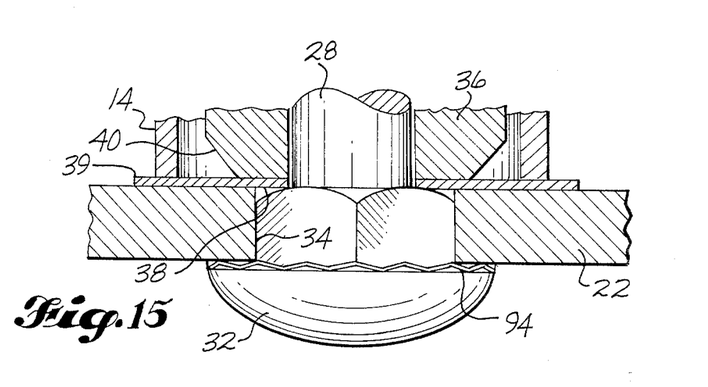
FIG. 15 is a fragmentary view of the assembly shown by FIG. 14, taken at the head end of the bolt, and showing the load indicating washer flattened.

FIG. 14 is a view like FIG. 8, showing a load indicating washer 100 positioned between bolt head 32 and member 22. In use, the member 22 and bolt 28 secured thereto are rotated relative to the nut 46 and member 14 secured thereto until the blisters 102 have been flattened washer 94 is used in the same way. The threaded joint is tightened until the peaks are flattened. The use of load indicating washers 94 or 100 provides a way of determining when the optimum tension value has been achieved, to prevent any unnecessary over tightening of the screw joint.

In accordance with the established law of patent interpretation, the embodiment that has been illustrated and described has been submitted by way of an example only. The scope of protection provided by the patent is to be determined by the terms of the following claims, and by the doctrine of equivalents.

What is claimed is:

1. A joint construction comprising:
   a first member including a cylindrical sidewall defining a socket having an inner surface;
   a second member including a connector assembly, said connector assembly comprising an axially-extending stud having a base, a free end and a threaded portion adjacent the free end;
   a cam ring at the base of the stud having a base end and an opposite end, said cam ring being smaller in diameter than the inside diameter of said socket, said cam ring including a beveled edge at its opposite end spaced radially outwardly from said stud;
   a main locking disk having a central portion with a center opening through which the stud extends, and a plurality of wings spaced around the disk and bent along fold lines to extend towards the edge of the cam ring, said wings having outer grip edges, and said main locking disk having a plan form sized to slip fit into said socket;
   a nut threaded onto the threaded portion of the stud outwardly of the main locking disk, said nut including lower stop means at its end nearest the cam ring and a wrench portion extending from said lower stop means in the direction opposite the cam ring, said wrench portion having side wrench surface means;
   a nut wing washer having a central opening through which said wrench portion of the nut extends, said opening corresponding in shape to the wrench surface means so that the nut wing washer is secured against rotation relative to the nut, said nut wing washer having a plurality of generally radial wings with outer edges, said nut wing washer having a plan form which is larger than the inside diameter of the socket;

upper stop means for holding the nut wing washer against axial movement off from the nut in a direction away from the lower stop means; and wherein the first and second members are connected together by an insertion movement of the connector assembly on the second member into the socket of the first member, with such movement causing a bending of the wings of the nut wing washer, attended by the outer edges of such wings gripping the inner surface of the socket and holding the nut wing washer against rotation, followed by a rotation of the second member relative to the first member, with the nut wing washer holding the nut in position relative to the first member during such rotation, causing relative axial travel of the nut on the stud towards the cam ring, and with such axial travel causing the beveled edge of the cam ring to push the wings of the main locking disk outwardly, so as to press their outer edges into tight gripping engagement with the inner surface of the socket.

2. A joint construction according to claim 1, comprising a plurality of main locking disks of the type described, positioned on the stud between the nut and cam ring, with the wings of all of the locking disks facing toward the cam ring.

3. A joint construction according to claim 1, wherein the upper stop means comprises deformed portions of the nut which project radially outwardly from the nut.

4. A joint construction according to claim 1, wherein contact is made between the edge of the cam ring and the wings of the main locking disk at a location spaced outwardly on the wings from the fold lines, and at least at the time of insertion a space exists axially between the central portion of the main locking disk and the cam ring.

5. A joint construction according to claim 1, wherein the main locking disk comprises a generally triangular central portion having three sides, said main locking disk having three wings, each of which is connected to a different side of said triangular portion by said fold line.

6. A joint construction according to claim 1, wherein the lower stop means comprises a flange at the lower end of the nut.

7. A joint construction according to claim 6, wherein the upper stop means comprises deformed portions of the nut which project radially outwardly from the nut.

8. A joint construction according to claim 1, wherein the nut wing washer has a generally conical body and the wings are radial extensions of such body.

9. A joint construction according to claim 8, wherein each wing has a pair of corner points at its outer ends and a recessed surface extending between the points, so that the points constitute the outermost portions of the nut wing washer.

10. A joint construction according to claim 1, wherein the outer grip edges of the wings of the main locking disk are substantially circular in plan form and define corners with side surface portions of the wings, said corners being urged into penetrating contact with the socket wall as the wings are being straightened in response to cam action on them during rotation of the second member relative to the first member.

11. A joint construction according to claim 1, comprising a washer between the second member and the cam ring which functions as a bearing surface, said cam ring rotating on said surface during rotation of the second member.

12. A joint construction according to claim 10, wherein said edge at the opposite end of the cam ring is a beveled edge at the periphery of the cam ring and a similar beveled edge is provided at the periphery of the cam ring at the base end of the cam ring.

13. A joint construction according to claim 1, comprising a washer between the second member and the cam ring which is of a diameter extending outwardly beyond the cylindrical sidewall of the first member, said washer being constructed from a material enabling it to function as an electrolytic barrier between the first and second members.

14. A joint construction according to claim 13, wherein said washer also functions as a bearing and it presents a bearing surface towards the cam ring, and during rotation of the second member relative to the first member the cam ring rotates relative to said bearing surface.

15. A joint construction according to claim 1, wherein said stud is a bolt and the base of the stud includes a bolt head on the side of the second member opposite the free end and threaded portions of the stud, and said joint construction further includes a load indicating washer between the bolt head and the second member, said washer having raised portions which flatten during rotation of the second member and the stud relative to the first member, and which when flat indicate that a sufficient amount of rotation has occurred.

16. A mounting structure for a suspended object, comprising:

a first member including a cylindrical sidewall defining a socket having an inner surface;

a second member including a connector assembly, said connector assembly comprising an axially-extending stud having a base, a free end and a threaded portion adjacent the free end;

a cam ring at the base of the stud having a base end and an opposite end, said cam ring being smaller in diameter than the inside diameter of said socket, said cam ring including a beveled edge at its opposite end spaced radially outwardly from said stud;

a main locking disk having a central portion with a center opening through which the stud extends, and a plurality of wings spaced around the disk and bent along fold lines to extend towards the edge of the cam ring, said wings having outer grip edges, and said main locking disk having a plan form sized to slip fit into said socket;

a nut threaded onto the threaded portion of the stud outwardly of the main locking disk, said nut including lower stop means at its end nearest the cam ring and a wrench portion extending from said lower stop means in the direction opposite the cam ring, said wrench portion having side wrench surface means;

a nut wing washer having a central opening through which said wrench portion of the nut extends, said opening corresponding in shape to the wrench surface means so that the nut wing washer is secured against rotation relative to the nut, said nut wing washer having a plurality of generally radial wings with outer edges, said nut wing washer having a plan form which is larger than the inside diameter of the socket;

upper stop means for holding the nut wing washer against axial movement off from the nut in a direction away from the lower stop means; and wherein the first and second members are connected together by an insertion movement of the connector assembly on the second member into the socket of the first member, with such movement causing a bending of the wings of the nut wing washer, attended by the outer edges of such wings gripping the inner surface of the socket and holding the nut wing washer against rotation, followed by a rotation of the second member relative to the first member, with the nut wing washer holding the nut in position relative to the first member during such rotation, causing relative axial travel of the nut on the stud towards the cam ring, and with such axial travel causing the beveled edge of the cam ring to push the wings of the main locking disk outwardly, so as to press their outer edges into tight gripping engagement with the inner surface of the socket.

17. A mounting structure according to claim 16, comprising a plurality of main locking disks of the type described, positioned on the stud between the nut and cam ring, with the wings of all of the locking disks facing toward the cam ring.

18. A mounting structure according to claim 16, wherein the upper stop means comprises deformed portions of the nut which project radially outwardly from the nut.

19. A mounting structure according to claim 16, wherein contact is made between the edge of the cam ring and the wings of the main locking disk at a location spaced outwardly on the wings from the fold lines, and at least at the time of insertion a space exists axially between the central portion of the main locking disk and the cam ring.

20. A mounting structure according to claim 16, wherein the main locking disk comprises a generally triangular central portion having three sides, said main locking disk having three wings, each of which is connected to a different side of said triangular portion by said fold line.

21. A mounting structure according to claim 16, wherein the lower stop means comprises a flange at the lower end of the nut.

22. A mounting structure according to claim 21, wherein the upper stop means comprises deformed portions of the nut which project radially outwardly from the nut.

23. A mounting structure according to claim 16, wherein the nut wing washer has a generally conical body and the wings are radial extensions of such body.

24. A mounting structure according to claim 23, wherein each wing has a pair of corner points at its outer ends and a recessed surface extending between the points, so that the points constitute the outermost portions of the nut wing washer.

25. A mounting structure according to claim 16, wherein the outer grip edges of the wings of the main locking disk are substantially circular in plan form and define corners with side surface portions of the wings, said corners being urged into penetrating contact with the socket wall as the wings are being straightened in response to cam action on them during rotation of the second member relative to the first member.

26. A mounting structure according to claim 16, comprising a washer between the second member and the cam ring which functions as a bearing surface. said cam ring rotating on said surface during rotation of the second member.

27. A mounting structure according to claim 25, wherein said edge at the opposite end of the cam ring is a beveled edge at the periphery of the cam ring and a similar beveled edge is provided at the periphery of the cam ring at the base end of the cam ring.

28. A mounting structure according to claim 16, comprising a washer between the second member and the cam ring which is of a diameter extending outwardly beyond the cylindrical sidewall of the first member, said washer being constructed from a material enabling it to function as an electrolytic barrier between the first and second members.

29. A mounting structure according to claim 28, wherein said washer also functions as a bearing and it presents a bearing surface towards the cam ring, and during rotation of the second member relative to the first member the cam ring rotates relative to said bearing surface.

30. A mounting structure according to claim 16, wherein said stud is a bolt and the base of the stud includes a bolt head on the side of the second member opposite the free end and threaded portions of the stud, and said mounting structure further includes a load indicating washer between the bolt head and the second member, said washer having raised portions which flatten during rotation of the second member and the stud relative to the first member, and which when flat indicate that a sufficient amount of rotation has occurred.

* * * * *